(12) United States Patent
Singuru et al.

(10) Patent No.: US 11,707,952 B2
(45) Date of Patent: Jul. 25, 2023

(54) METHOD AND SYSTEM FOR DETERMINING TIRE EFFECTIVE RADIUS

(71) Applicant: GM GLOBAL TECHNOLOGY OPERATIONS LLC, Detroit, MI (US)

(72) Inventors: Kausalya Singuru, Troy, MI (US); Bakhtiar B. Litkouhi, Washington, MI (US); Hualin Tan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 370 days.

(21) Appl. No.: 16/952,799

(22) Filed: Nov. 19, 2020

(65) Prior Publication Data

US 2022/0153070 A1 May 19, 2022

(51) Int. Cl.
*B60C 23/06* (2006.01)
*B60T 8/172* (2006.01)
*B60C 23/04* (2006.01)

(52) U.S. Cl.
CPC ........ *B60C 23/061* (2013.01); *B60C 23/0488* (2013.01); *B60T 8/172* (2013.01); *B60G 2400/204* (2013.01); *B60G 2400/208* (2013.01); *B60T 2250/042* (2013.01)

(58) Field of Classification Search
CPC .............. B60C 23/061; B60C 23/0488; B60T 8/172; B60T 2250/042; B60T 2210/36; B60T 2240/07; B60T 2250/06; B60G 2400/204; B60G 2400/208; B60W 40/12; B60W 50/00; B60W 2050/0019; B60W 2520/10; B60W 2520/28

USPC ......................................................... 340/444
See application file for complete search history.

(56) References Cited

U.S. PATENT DOCUMENTS

| | | | |
|---|---|---|---|
| 1,089,319 A | 3/1914 | Campbell | |
| 6,324,446 B1 | 11/2001 | Brown et al. | |
| 6,804,623 B2 * | 10/2004 | Oshiro | B60C 23/061 702/140 |
| 7,187,273 B2 | 3/2007 | Rieck et al. | |
| 7,522,032 B2 | 4/2009 | Nakao | |
| 7,831,346 B2 | 11/2010 | Kitano | |
| 7,908,112 B2 | 3/2011 | Nardi et al. | |

(Continued)

OTHER PUBLICATIONS

Ozkan, Lundquist, Gustafsson; A bayesian Approach to Jointly Estimate Tire Radii and Vehicle Trajectory.

(Continued)

*Primary Examiner* — Eric Blount
(74) *Attorney, Agent, or Firm* — Quinn IP Law (57) ABSTRACT

A tire radius monitoring system for dynamically determining a tire effective radius for each of the wheels on a vehicle is described. The system includes a GPS sensor, a plurality of wheel speed sensors, and a controller. The controller determines, via the GPS sensor, a velocity vector related to longitudinal velocity of the vehicle. The controller determines wheel speeds for the plurality of vehicle wheels, and detects a no-wheel-slip state for the vehicle wheels and the velocity vector from the GPS sensor. The controller determines tire effective radii for the plurality of vehicle wheels based upon the velocity vector for the vehicle and the wheel speeds for the plurality of vehicle wheels during the no-wheel-slip state, and controls vehicle operation based upon the tire effective radii.

19 Claims, 3 Drawing Sheets

(56) References Cited

U.S. PATENT DOCUMENTS

| | | | |
|---|---|---|---|
| 8,108,104 B2 * | 1/2012 | Hrovat | B60G 17/0162 |
| | | | 280/5.509 |
| 8,234,090 B2 | 7/2012 | Nardi et al. | |
| 9,754,490 B2 | 9/2017 | Kentley et al. | |
| 9,983,097 B2 * | 5/2018 | Poloni | G07C 5/02 |
| 10,759,415 B2 | 9/2020 | Litkouhi et al. | |
| 10,960,712 B2 * | 3/2021 | Storti | G06N 20/10 |
| 11,485,331 B2 * | 11/2022 | Gan | B60T 8/17551 |
| 2006/0253240 A1 | 11/2006 | Rao et al. | |
| 2006/0267750 A1 * | 11/2006 | Lu | B60C 23/062 |
| | | | 280/5.502 |
| 2010/0131145 A1 | 5/2010 | Ryu et al. | |
| 2011/0098882 A1 | 4/2011 | Sugisawa et al. | |
| 2012/0022780 A1 | 1/2012 | Kulik et al. | |
| 2012/0179327 A1 * | 7/2012 | Yngve | B60W 40/064 |
| | | | 701/32.9 |
| 2017/0016740 A1 | 1/2017 | Cui et al. | |
| 2017/0023441 A1 * | 1/2017 | Luk | B60C 23/06 |
| 2017/0363515 A1 * | 12/2017 | Poloni | G07C 5/02 |
| 2018/0107215 A1 | 4/2018 | Djuric et al. | |

OTHER PUBLICATIONS

Carlson; Estimation With Applications for Automobile Dead Reckoning and Control; Deparlment of Mechanical Engineering at Stanford University—Dissertation; 2004.

* cited by examiner

METHOD AND SYSTEM FOR DETERMINING TIRE EFFECTIVE RADIUS

INTRODUCTION

Vehicle control systems may benefit from information related to vehicle parameters, including tire effective radius. This information may be employed as an input for controlling one or more vehicle systems that control vehicle braking, cornering and/or acceleration.

Known on-vehicle systems treat the tire effective radius as a constant calibration value. However, dynamically variable factors such as tire pressure, ambient temperature, surface temperature, tire temperature, vehicle load, etc., may cause variation in the tire effective radius, which in turn may affect performance of the vehicle systems related to vehicle braking, cornering and acceleration. Furthermore, inaccuracies or errors in determining the tire effective radius may affect performance of driving assistance systems such as an advanced driving assistance system (ADAS) or another autonomous vehicle system.

SUMMARY

A tire radius monitoring system for dynamically determining a tire effective radius for each of the wheels on a vehicle is described, and includes a Global Positioning System (GPS) sensor, a plurality of wheel speed sensors arranged to monitor rotational speeds of a plurality of vehicle wheels, and a controller. The controller is in communication with the GPS sensor and the plurality of wheel speed sensors, and includes an instruction set that may be reduced to practice as one or multiple algorithms and calibrations. The instruction set is executable to determine, via the GPS sensor, a velocity vector related to longitudinal velocity of the vehicle. The algorithm also determines, via the plurality of wheel speed sensors, wheel speeds for the plurality of vehicle wheels, and detects a no-wheel-slip state for the plurality of vehicle wheels and the longitudinal velocity vector from the GPS sensor. The algorithm operates to determine tire effective radii for the plurality of vehicle wheels based upon the longitudinal velocity vector for the vehicle and the wheel speeds for the plurality of vehicle wheels during the no-wheel-slip state, and controls vehicle operation based upon the tire effective radii.

An aspect of the disclosure includes a slew rate filter that includes a state vector that is based upon the tire effective radii and a measurement vector that is based upon the wheel speeds for the plurality of vehicle wheels. The instruction set executes the slew rate filter to determine the tire effective radii based upon the state vector and the measurement vector.

Another aspect of the disclosure includes the slew rate filter being a Kalman filter, and wherein the Kalman filter executes to determine the tire effective radii employing the state vector and the measurement vector.

Another aspect of the disclosure includes the slew rate filter having a plurality of calibrated gain factors that are specific to a plurality of vehicle speed ranges corresponding to the longitudinal velocity vector for the vehicle.

Another aspect of the disclosure includes the plurality of calibrated gain factors specific to the vehicle speed range in the form of a first calibrated gain factor corresponding to a first of the plurality of vehicle speed ranges that corresponds to a low speed range, a second calibrated gain factor corresponding to a second of the plurality of vehicle speed ranges that corresponds to a mid-speed range, and a third calibrated gain factor corresponding to a third of the plurality of vehicle speed ranges that corresponds to a high-speed range.

Another aspect of the disclosure includes the instruction set being executable to determine tire pressures for the plurality of vehicle wheels based upon the tire effective radii.

Another aspect of the disclosure includes the instruction set being executable to detect the no-wheel-slip state for the plurality of vehicle wheels based upon the longitudinal velocity vector for the vehicle and the wheel speeds for the plurality of vehicle wheels.

Another aspect of the disclosure includes a tire radius monitoring system for a vehicle having a Global Positioning System (GPS) sensor, a plurality of wheel speed sensors arranged to monitor rotational speeds of a plurality of vehicle wheels, and a controller. The controller is in communication with the GPS sensor and the plurality of wheel speed sensors, and the controller includes an instruction set that is executable to determine, via the GPS sensor, a longitudinal velocity vector for the vehicle; determine, via the plurality of wheel speed sensors, wheel speeds for the plurality of vehicle wheels; determine a measurement vector including the wheel speeds for the plurality of vehicle wheels and the longitudinal velocity vector for the vehicle; and execute a slew rate filter to determine a state vector including tire effective radii for the plurality of vehicle wheels. The state vector is determined based upon the measurement vector including the wheel speeds for the plurality of vehicle wheels and the longitudinal velocity vector for the vehicle. Operation of the vehicle is controlled based upon the state vector including the tire effective radii.

Another aspect of the disclosure includes a method for operating a vehicle by determining, via a Global Positioning System (GPS) sensor, a longitudinal velocity vector for the vehicle, and determining, via a plurality of wheel speed sensors, wheel speeds for a plurality of vehicle wheels. A Kalman filter is executed to determine tire effective radii for the plurality of vehicle wheels based upon the velocity for the vehicle and the wheel speeds for the plurality of vehicle wheels.

Another aspect of the disclosure includes detecting a low tire pressure event for one of the vehicle wheels based upon one of the tire effective radii for the plurality of vehicle wheels.

Another aspect of the disclosure includes correlating vehicle mass and tire pressure to the tire effective radii.

The tire radius monitoring system described herein may be reduced to practice as one or multiple algorithms that estimate tire effective radii in real time employing information from wheel sensor sensors and a GPS sensor. The algorithm includes calibrating a nominal tire radius for each of the wheels for future drive cycles. The algorithm may also correlate the tire effective radius with tire pressure and vehicle mass employing a lookup table. The implementation of the algorithms to estimate tire effective radii in real time may be robust and computationally efficient.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Figure 1:
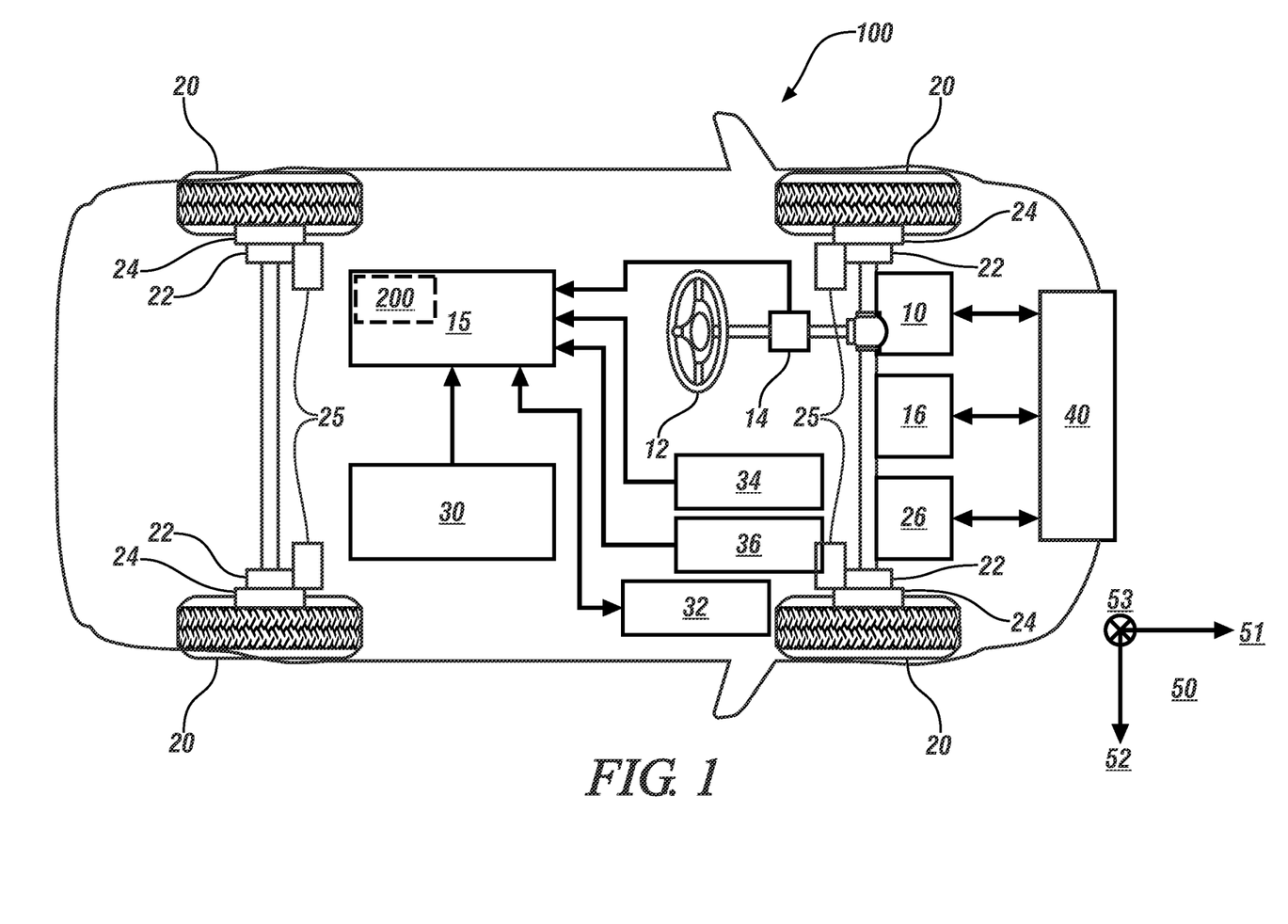
FIG. 1 schematically illustrates a top-view of a vehicle, in accordance with the disclosure.

FIG. 1, consistent with embodiments disclosed herein, schematically illustrates a vehicle 100 that is disposed on a travel surface, wherein the vehicle 100 has operating systems including, e.g., a propulsion system 10, a steering system 16, and a wheel braking system 26. The steering system 16 includes a steering wheel 12 and a steering actuator 14. The vehicle 100 also includes a plurality of wheels 20, wheel speed sensors 22 and wheel brakes 24, and a navigation system 32. The vehicle 100 also includes a tire radius monitoring system 200 for dynamically determining a tire effective radius for each of the plurality of vehicle wheels 20. Details of the tire radius monitoring system 200 are described with reference to FIGS. 2 and 3. The vehicle 100 may include, in some embodiments, a tire pressure monitoring system (TPMS) 25. The vehicle 100 may include, in some embodiments, a spatial monitoring system 30 and an advanced driver assistance system (ADAS) 40. Operation of the vehicle 100, including the aforementioned operating systems, is controlled by a plurality of controllers that execute control routines, referred to hereinafter as controller 15.

Each of the plurality of wheels 20 may be arranged with a rigid rim portion having an inflatable tire mounted thereon. Each of the plurality of wheels 20 is characterized by various parameters, including a tire effective radius. The tire effective radius, as employed herein, represents a linear distance that may be measured between a center of the wheel 20 and the ground surface when the wheel 20 is carrying the vehicle 100 under load. The tire effective radius is influenced by internal air pressure, vehicle speed, tire and ambient temperatures, vehicle acceleration, braking, pitch, yaw, etc.

A top-view of the vehicle 100 is shown. The vehicle 100 and the travel surface define a spatial domain in the form of a three-dimensional coordinate system 50 that includes a longitudinal (X) axis 51, a lateral (Y) axis 52 and a vertical (Z) axis 53. The longitudinal axis 51 is defined by a longitudinal axis of the vehicle 100, the lateral axis 52 is defined by a lateral axis of the vehicle 100, and the vertical axis 53 is defined as being orthogonal to a plane defined by the longitudinal axis 51 and the lateral axis 52. The vehicle 100 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The navigation system 32 employs information from a Global Positioning System (GPS) sensor 36 and, in one embodiment, an Inertial Measurement Unit (IMU) 34. In one embodiment, a global navigation satellite system (GNSS) sensor may be employed in place of the GPS sensor 36. The IMU 34 is an electronic device that employs one or more of a combination of accelerometers, gyroscopes, and magnetometers to measure and report specific force, angular rate, yaw, and orientation of the vehicle 100.

In certain embodiments of the vehicle 100, the ADAS 40 is arranged to provide operator assistance features by controlling one of the operating systems, i.e., one or more of the propulsion system 10, the steering system 16, the wheel braking system 26, in conjunction with or without direct interaction of the vehicle operator. The ADAS 40 includes a controller and one or a plurality of subsystems that provide operator assistance features, including one or more of an adaptive cruise control (ACC) system, a lane-keeping control (LKY) system, a lane change control (LCC) system, an autonomous braking/collision avoidance system, and/or other systems that are configured to command and control autonomous vehicle operation separate from or in conjunction with operator requests. The ADAS 40 may interact with and access information from an on-board map database for route planning and to control operation of the vehicle 100 via the lane-keeping system, the lane-centering system, and/or other systems that are configured to command and control autonomous vehicle operation. Autonomous operating commands may be generated to control the ACC system, the LKY system, the LCC system, the autonomous braking/collision avoidance system, and/or the other systems. Vehicle operation may be in response to operator requests and/or autonomous vehicle requests. Vehicle operation includes acceleration, braking, steering, steady-state running, coasting, and idling. Operator requests can be generated based upon operator inputs to an accelerator pedal, a brake pedal, a steering wheel, a transmission range selector, the ACC system, etc.

The on-board navigation system 32 may include a computer-readable storage device or media (memory) that includes a digitized roadway map and is in communication with the ADAS 40.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
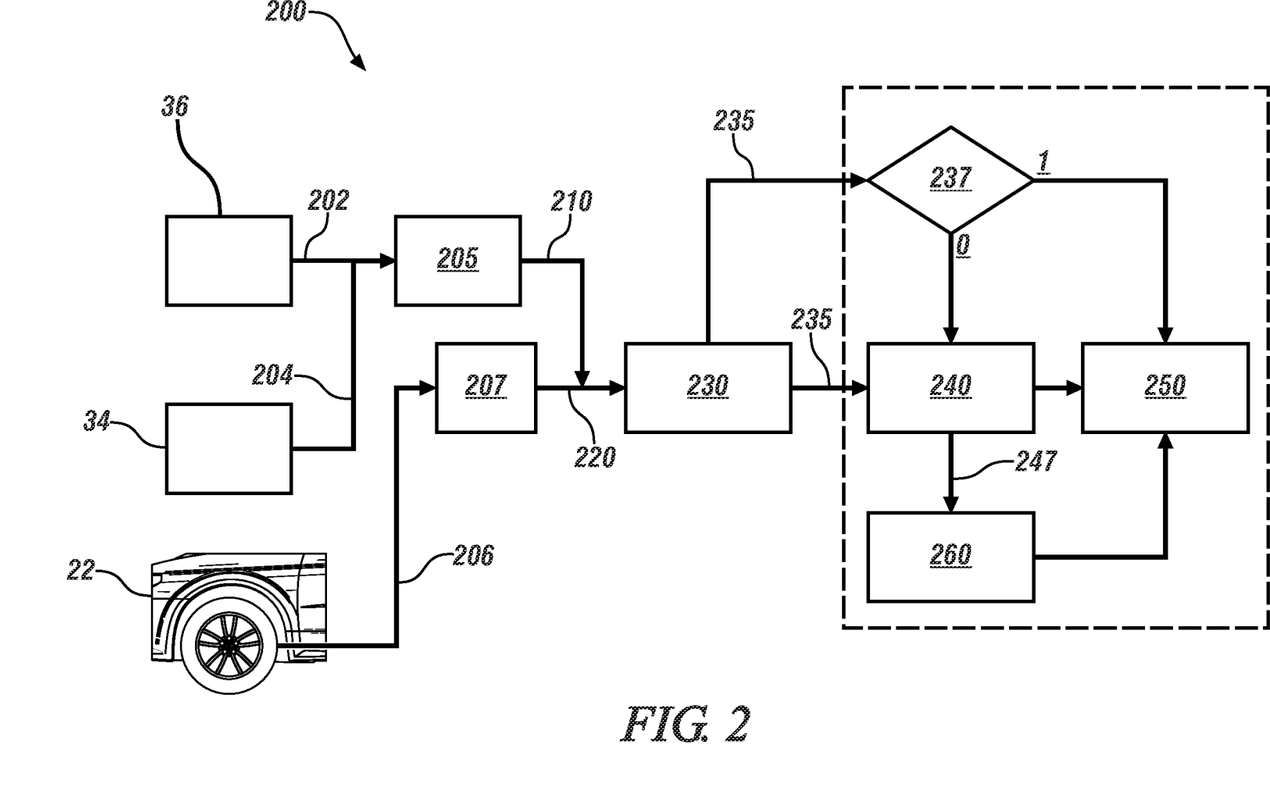
FIGS. 2 and 3 schematically show a routine for estimating tire effective radii in real time employing information from wheel sensor sensors and a GPS sensor, in accordance with the disclosure.
Figure 3:
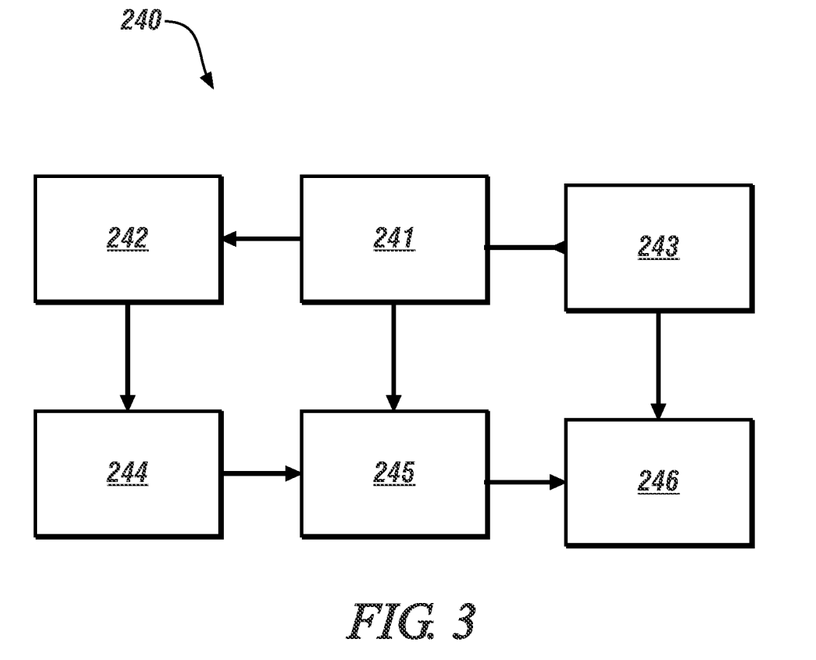

Referring now to FIGS. 2 and 3, with continued reference to the vehicle 100 that is described with reference to FIG. 1, the tire radius monitoring system 200 is described for dynamically determining a tire effective radius for each of the plurality of vehicle wheels 20, employing information from the GPS sensor 36, the IMU 34, and the wheel speed sensors 22. The details of the tire radius monitoring system 200 are described in context of a vehicle that employs four wheels. However, it is appreciated that the concepts described herein may be applied to two-wheel vehicles, three-wheel vehicles, five-wheel vehicles, six-wheel vehicles, etc.

The tire radius monitoring system 200 includes regularly monitoring data generated by the GPS sensor 36, the IMU 34, and the wheel speed sensors 22.

The GPS sensor 36 generates a first set of parameters associated with a vehicle velocity vector 202, along with geospatial position and heading for the vehicle 100. In one embodiment, the vehicle velocity vector 202 that is described with reference to an ENU (East-North-Up) reference frame, and a vehicle reference frame, wherein the vehicle positive x-axis points towards the front of the vehicle, the vehicle's positive y-axis or pitch axis points leftward, and the positive z-axis or yaw axis points upward. The vehicle velocity vector 202 includes vehicle velocity parameters including $V_E$, $V_N$, and $V_U$, which relate to velocities in the respective East (E), North (N), and Up (U) axes.

The IMU 34 generates a second set of parameters related to vehicle yaw angle 204. The term heading or yaw refers to the direction a vehicle is pointing. The second set of parameters 204 may include acceleration in each of the x, y, and z axes (a_xm, a_ym, a_zm) and angular velocity in each of the x, y, and z axes ($\omega\_x$, $\omega\_y$, $\omega\_z$). The angular accelerations (A_x, A_y, A_z) may be obtained by numerical derivation of the angular velocities.

The vehicle velocity vector 202 and the vehicle yaw angle 204 are input to an estimator 205, from which a longitudinal velocity vector Vx 210 is estimated. The longitudinal velocity vector Vx 210 represents the forward motion of the vehicle 100 along the longitudinal axis. The longitudinal velocity vector Vx 210 is referred to herein as follows:

$$[\upsilon_{xlr}, \upsilon_{xrr}, \upsilon_{xlf}, \upsilon_{xlr}]$$

wherein:

$\upsilon_{xlr}$ represents the vehicle ground speed in the x direction for the left rear wheel, $\upsilon_{xrr}$ represents the vehicle ground speed in the x direction for the right rear wheel, $\upsilon_{xlf}$ represents the vehicle ground speed in the x direction for the left front wheel; and $\upsilon_{xlr}$ represents the vehicle ground speed in the x direction for the right front wheel.

The wheel speed sensors 22 generate angular velocities 206 for the vehicle wheels 20. The angular velocities 206 are input to an averaging routine 207, from which an angular velocity vector 220 is determined. The angular velocity vector 220 includes moving averages for the angular velocities 206, referred to herein as follows:

$$[\omega_{xlr}, \omega_{xrr}, \omega_{xlf}, \omega_{xrf}]$$

wherein:

$\omega_{xrf}$ represents the rotational speed in the x direction for the left rear wheel, $\omega_{xrr}$ represents the rotational speed in the x direction for the right rear wheel, $\omega_{xlf}$ represents the rotational speed in the x direction for the left front wheel; and $\omega_{xlr}$ represents the rotational speed in the x direction for the right front wheel.

The vehicle speed vector Vx 210 and the angular velocity vector 220 are combined to form a measurement vector $\underline{Y}_k$ as follows:

$$\underline{Y}_k = \left[ \frac{V_{xlr}}{\omega_{xlr}} \frac{V_{xrr}}{\omega_{xrr}} \frac{V_{xlf}}{\omega_{xlf}} \frac{V_{xrf}}{\omega_{xrf}} \right]^T \quad [1]$$

The measurement vector $\underline{Y}_k$ is provided as input to a slew rate filter 230, which is executed to determine a tire effective radius for each of the wheels 20 of the vehicle 100 based thereon. In one embodiment, and as described herein, the slew rate filter 230 is in the form of a Kalman filter, and more specifically as a linear Kalman filter in one embodiment. Kalman filtering, also known as linear quadratic estimation (LQE), is an analytical construct that can be reduced to practice as an algorithm that uses a series of measurements observed over time, containing statistical noise and other inaccuracies, and produces estimates of unknown variables based upon the measurements that are observed over a period of time.

The slew rate filter 230 includes the measurement vector $\underline{Y}_k$ that is based upon the wheel speeds for the plurality of vehicle wheels and the vehicle velocity. The slew rate filter 230 includes a state vector that represents the tire effective radii of the wheels 20 of the vehicle 100. The state vector may be expressed as follows:

$$\hat{\underline{X}}_k = [R_{lr} R_{rr} R_{lf} R_{rf}]^T \quad [2]$$

When the slew rate filter 230 is a Kalman filter, the state and measurement equations may be represented as follows:

$$xk+1 = Axk + Buk + Gwk$$

$$yk = Cxk + vk.$$

The state vector $x_k$ for the slew rate filter 230 is represented as follows:

$$x_k = [R_{lr} R_{rr} R_{lf} R_{rf}]^T. \quad [3]$$

The measurement vector $y_k$ for the slew rate filter 230 is represented as follows:

$$y_k = \begin{bmatrix} V_{xlr} & V_{xrr} & V_{xlf} & V_{xrf} \\ \omega_{xlr} & \omega_{xrr} & \omega_{xlf} & \omega_{xrf} \end{bmatrix}^T. \quad [4]$$

Process noise $w_k$ and measurement noise $v_k$ are zero-mean white noise processes with covariance matrices $Q_w$ and $R_v$ respectively.

The one-step prediction that is executed by the slew rate filter 230 to determine the tire effective radius is as follows:

$$\hat{x}_{k+1|k} = A\hat{x}_{k|k-1} + Bu_k + k_p(y_k - C\hat{x}_{k|k-1}) \quad [5]$$

The term $\hat{x}$ represents an estimate of the tire effective radius for one of the vehicle wheels 20, wherein $A \in R^{n \times n}$, $B \in R^{n \times m}$, $G \in R^{x \times g}$ and $C \in R^{p \times n}$, wherein n is number of states, m is number of outputs, p is the number of inputs and x and g are assumed to be equal to the number of states.

The term $k_p$ represents a gain factor that can be determined as follows:

$$k_p = AP_pA^T + GQ_wG^T \quad [6]$$

An initial suboptimal filter is based on initial values for the covariance matrices $Q_w$ and $R_v$. The objective of speed based gain calibration is to estimate the covariance matrices $Q_w$ and $R_v$ and use these to compute the gain factor $k_p$ in relation to vehicle speed. The gain factor $k_p$ in relation to vehicle speed may be determined for several vehicle speed ranges, an example of which is included in Table 1, as follows.

TABLE 1

| Speed Range | 0-5 m/s | 5-15 m/s | 15-30 m/s | >30 m/s |
|---|---|---|---|---|
| Gain Factor | $k_p(0)$ | $k_p(1)$ | $k_p(2)$ | $k_p(3)$ |

These gain factors $k_p(0)$, $k_p(1)$, $k_p(2)$, and $k_p(3)$ are employed in improving accuracy of the tire effective radii that is estimated in subsequent executions. The gains are calibrated to achieve faster convergence at low speeds and slower convergence at high speed. Changes in the tire effective radius may occur over a relatively long period of time. The calibrated gain factors are specific to a vehicle speed range in one embodiment. This may include a first calibrated gain factor $k_p(0)$ corresponding to a first of the plurality of vehicle speed ranges that corresponds to a low speed range, wherein the low speed range is 0-5 m/s in one embodiment. This may include second calibrated gain factors $k_p(1)$ and $k_p(2)$, which correspond to mid-speed ranges. In one embodiment, the mid-speed ranges and calibrated gain factors include a mid-speed range of 5-15 m/s and associated gain factor $k_p(1)$, and a mid-speed range of 15-30 m/s and associated gain factor $k_p(2)$. This may include a third calibrated gain factor $k_p(3)$ corresponding to a third of the plurality of vehicle speed ranges that corresponds to a high-speed range, wherein the high speed range is >30 m/s in one embodiment. The quantity of speed ranges, gain factors, and associated magnitudes of the speed ranges may be application-specific, and are determined based upon factors related to vehicle capabilities, etc.

The slew rate filter 230 generates a state vector 235, which represents the tire effective radii of the wheels 20 of the vehicle 100. The state vector 235 is input to a post-processing step 240, which is described in detail with reference to FIG. 3.

The state vector 235 and other vehicle operating parameters are evaluated to determine if the vehicle 100 is undergoing a change in the drive cycle, e.g., a change in speed (237). If there is no change in the drive cycle (237)(0), the post-processing step 240 is executed (240). If there has been a change in the drive cycle (237)(1), execution of the post-processing step 240 is postponed, and the tire effective radii of the wheels 20 is recovered from a non-volatile memory device (250) for use by the vehicle controller 15.

Referring now to FIG. 3, the post-processing step 240 includes evaluating the tire effective radii of the wheels 20 in context of vehicle operation to eliminate singular or exceptional data points output from the slew rate filter 230 (241). Singular or exceptional data points output from the slew rate filter 230 may be associated with pre-defined non-steady state events such as a braking event, a throttle event that may induce wheel slip, and nonlinear dynamic maneuvers that include, e.g., road surfaces that may include snow, ice, and road conditions including uphill or downhill maneuvers.

The occurrence of no-slip conditions may be determined in accordance with the following relationships:

$$\sigma = \frac{Vx - \omega Reff}{Vx} \quad [7]$$

$$Reff = \frac{Vx}{\omega} \quad [8]$$

wherein:
σ represents wheel slip;
ω represents the rotational wheel speed; and
Vx represents the vehicle speed vector, i.e., the longitudinal velocity vector.

The wheel slip a is calculated for each of the vehicle wheels 20 using EQS. 5 and 6. The detection of occurrence of no-slip conditions may further include a comparative analysis of the wheel speeds of the plurality of vehicle wheels 20.

The post-processing step 240 includes evaluating the vehicle speed in context of the speed ranges, e.g., as described with reference to Table 1, above, to identify the corresponding speed range (242).

The post-processing step 240 includes determining and modifying, where necessary, the respective gain, i.e., one of gains $k_p(0)$, $k_p(1)$, $k_p(2)$, and $k_p(3)$, to improve convergence based upon speed and uncertainty of input variables. The gains are determined based on factors such as speed threshold, uncertainty of received velocity input to the algorithm and a tunable calibration parameter for customization. (244).

The post-processing step 240 includes capturing successive estimates of the tire effective radii of the wheels 20 in a data buffer over a period of time during a drive cycle, and determining mean values for the tire effective radii of the wheels 20 (245).

The post-processing step 240 includes correlating the tire effective radii of the wheels 20 with tire pressures of the wheels 20, using a look up table or another form of predetermined calibrations (243). One example of a correlation between the tire effective radii of the wheels 20 and tire pressures of the wheels 20 is graphically illustrated with reference to FIG. 4. Data may be developed to provide a correlation between tire radius, tire pressure, tire temperature and vehicle mass, which may be represented as follows in Table 2 and reduced to practice as a lookup table that is implemented in a storage device in the controller 15 and accessible to the tire radius monitoring system 200.

TABLE 2

| Radius (mm) | Pressure (kPa) | Temperature (C.) | Mass (kg) |
| --- | --- | --- | --- |

When the elements depicted with reference to Table 2 are developed and implemented on-vehicle, the tire effective radii of the wheels 20 that are determined employing the tire radius monitoring system may be used to estimate vehicle mass, detect tire pressure, and other parameters that are associated with tire pressures of the wheels 20.

The post-processing step 240 includes compiling and storing the mean values for the tire effective radii of the wheels 20, the correlated tire pressures from step 243, and the updated gains $k_p(0)$, $k_p(1)$, $k_p(2)$, and $k_p(3)$ from step 244 (246).

The mean values for the tire effective radii of the wheels 20, the correlated tire pressures from step 243, and the updated gains $k_p(0)$, $k_p(1)$, $k_p(2)$, and $k_p(3)$ are provided as an output 247 from the post-processing step 240.

Referring again to FIG. 2, the output 247 from the post-processing step 240, i.e., the mean values for the tire effective radii of the wheels 20, the correlated tire pressures from step 243, and the updated gains $k_p(0)$, $k_p(1)$, $k_p(2)$, and $k_p(3)$, are provided to a non-volatile memory device for storage and subsequent use by the vehicle controller 15 (250).

Furthermore, the output 247 from the post-processing step 240, i.e., the mean values for the tire effective radii of the wheels 20 are evaluated to determine if there has been a change in one or more of the tire effective radii of the wheels 20 that may necessitate informing the vehicle operator (260). By way of a non-limiting example, there may be a need to inform a vehicle operator of occurrence of a low-tire pressure event.

The output 247 from the post-processing step 240, i.e., the mean values for the tire effective radii of the wheels 20 may be communicated to the controller 15 and employed in operation of vehicle control systems, including, e.g., the propulsion system 10, the steering system 16, the wheel braking system 26, and/or the ADAS 40, which can control routines that account for or mitigate tire pressure variations, low tire pressure events, etc.

Figure 4:
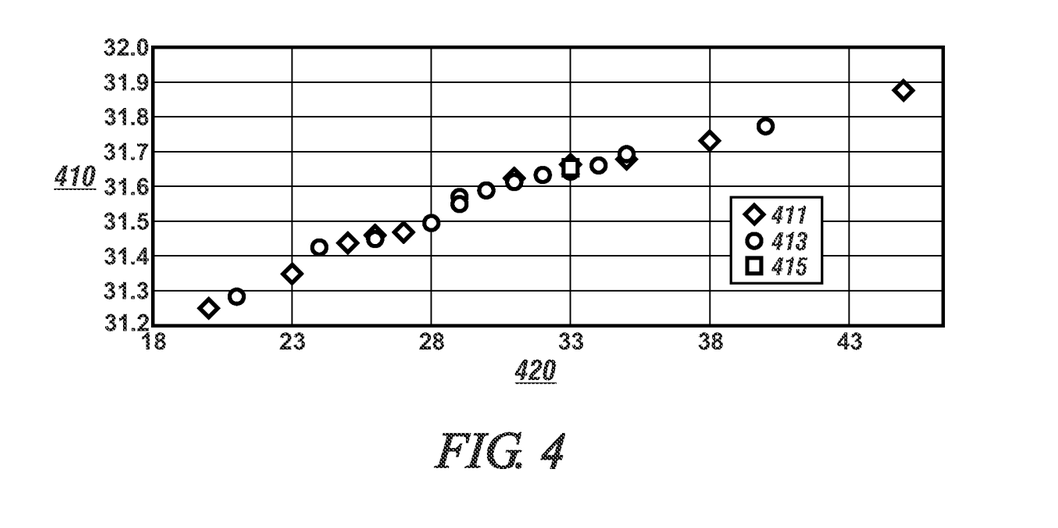
FIG. 4 graphically illustrates a relationship between an estimated tire effective radius and tire pressure, in accordance with the disclosure.

FIG. 4 graphically illustrates data associated with operation of an embodiment of the vehicle 100 described with reference to FIG. 1 executing an embodiment of the tire radius monitoring system 200 to dynamically determine a tire effective radius for each of the plurality of vehicle wheels 20. The data includes data points of the tire effective radius for a right front tire (data indicated by 411), tire effective radius for a left front tire (data indicated by 413), which was accumulated with the vehicle 100 operating over a range of vehicle speeds from 5 mph to 35 mph, and with tire pressure varying over a range between 24 psi and 45 psi. The graph indicates tire radius 410 on the vertical axis in relation to tire pressure 420 on the horizontal axis. The data also includes a static ground truth measurement at 33 psi (data indicated by 415). The results indicate that the embodiment of the tire radius monitoring system 200 was capable of dynamically monitoring the tire effective radius with a maximum error that was less than 0.5 mm.

The concepts described herein enable an ability to determine robust tire effect radius estimates by eliminating dynamic, high slip conditions through event-based data buffering, and calibrating the tire effect radii over multiple drive cycles, taking into account vehicle mass.

In one embodiment, the tire radius monitoring system 200 described herein has a capability to detect tire pressure variations, which may be employed to control vehicle operation based upon the tire effective radii, including supplementing or verifying information from a tire pressure monitoring system (TPMS) on an embodiment of the vehicle 100.

In one embodiment, the tire radius monitoring system 200 described herein has a capability to detect tire pressure variations, which may be employed to supplant a tire pressure monitoring system (TPMS), rendering the TPMS redundant on an embodiment of the vehicle 100.

The block diagrams in the flow diagrams illustrate the architecture, functionality, and operation of possible implementations of systems, methods, and computer program products according to various embodiments of the present disclosure. In this regard, each block in the block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A tire radius monitoring system for a vehicle, comprising:
a Global Positioning System (GPS) sensor, a plurality of wheel speed sensors arranged to monitor rotational speeds of a plurality of vehicle wheels, a slew rate filter, and a controller;
wherein the controller is in communication with the GPS sensor and the plurality of wheel speed sensors;
wherein the controller includes an instruction set, the instruction set being executable to:
determine, via the GPS sensor, a longitudinal velocity vector (Vx) for the vehicle;
determine, via the plurality of wheel speed sensors, wheel speeds for the plurality of vehicle wheels;
detect a no-wheel-slip state for the plurality of vehicle wheels;
execute the slew rate filter to determine tire effective radii for the plurality of vehicle wheels based upon the longitudinal velocity vector for the vehicle and the wheel speeds for the plurality of vehicle wheels during the no-wheel-slip state, wherein the slew rate filter includes a state vector that is based upon the tire effective radii and a measurement vector that is based upon the wheel speeds for the plurality of vehicle wheels, and wherein the slew rate filter includes a plurality of calibrated gain factors corresponding to a plurality of vehicle speed ranges associated with the longitudinal velocity vector for the vehicle; and
control vehicle operation based upon the tire effective radii.

2. The tire radius monitoring system of claim 1, wherein the slew rate filter comprises a Kalman filter, and wherein the instruction set executes the Kalman filter to determine the tire effective radii employing the state vector that is based upon the tire effective radii and the measurement vector that is based upon the wheel speeds for the plurality of vehicle wheels.

3. The tire radius monitoring system of claim 1, wherein the plurality of calibrated gain factors specific to the vehicle speed range comprises a first calibrated gain factor corresponding to a first of the plurality of vehicle speed ranges that corresponds to a low speed range, a second calibrated gain factor corresponding to a second of the plurality of vehicle speed ranges that corresponds to a mid-speed range, and a third calibrated gain factor corresponding to a third of the plurality of vehicle speed ranges that corresponds to a high-speed range.

4. The tire radius monitoring system of claim 1, further comprising the instruction set being executable to determine tire pressures for the plurality of vehicle wheels based upon the tire effective radii.

5. The tire radius monitoring system of claim 1, wherein the instruction set is executable to detect the no-wheel-slip state for the plurality of vehicle wheels based upon the longitudinal velocity vector for the vehicle and the wheel speeds for the plurality of vehicle wheels.

6. The tire radius monitoring system of claim 1, further comprising the instruction set being executable to correlate vehicle mass and tire pressure to the tire effective radii.

7. A tire radius monitoring system for a vehicle, comprising:
a Global Positioning System (GPS) sensor, a plurality of wheel speed sensors arranged to monitor rotational speeds of a plurality of vehicle wheels, and a controller;
wherein the controller is in communication with the GPS sensor and the plurality of wheel speed sensors;
wherein the controller includes an instruction set, the instruction set being executable to:
determine, via the GPS sensor, a longitudinal velocity vector for the vehicle;
determine, via the plurality of wheel speed sensors, wheel speeds for the plurality of vehicle wheels;
determine a measurement vector including the wheel speeds for the plurality of vehicle wheels and the longitudinal velocity vector for the vehicle;
execute a slew rate filter to determine a state vector including tire effective radii for the plurality of vehicle wheels, wherein the state vector is determined based upon the measurement vector including the wheel speeds for the plurality of vehicle wheels and the longitudinal velocity vector for the vehicle,
wherein the slew rate filter comprises a Kalman filter including a plurality of calibrated gain factors that are specific to a plurality of vehicle speed ranges corresponding to the longitudinal velocity vector for the vehicle, and wherein the instruction set executes the Kalman filter to determine the state vector including the tire effective radii based upon the measurement vector including the wheel speeds for the plurality of vehicle wheels and the longitudinal velocity vector for the vehicle; and
control vehicle operation based upon the state vector including the tire effective radii.

8. The tire radius monitoring system of claim 7, wherein the plurality of calibrated gain factors specific to the vehicle speed range comprises a first calibrated gain factor corresponding to a first of the plurality of vehicle speed ranges that corresponds to a low speed range, a second calibrated gain factor corresponding to a second of the plurality of vehicle speed ranges that corresponds to a mid-speed range, and a third calibrated gain factor corresponding to a third of the plurality of vehicle speed ranges that corresponds to a high-speed range.

9. The tire radius monitoring system of claim 7, further comprising the instruction set being executable to determine tire pressures for the plurality of vehicle wheels based upon the tire effective radii.

10. The tire radius monitoring system of claim 7, wherein the instruction set is executable to detect a no-wheel-slip state for the plurality of vehicle wheels based upon the longitudinal velocity vector for the vehicle and the wheel speeds for the plurality of vehicle wheels.

11. A method for operating a vehicle, the method comprising:
determining, via a Global Positioning System (GPS) sensor, a longitudinal velocity for the vehicle;
determining, via a plurality of wheel speed sensors, wheel speeds for a plurality of vehicle wheels;
determining a plurality of calibrated gain factors that are specific to a plurality of vehicle speed ranges corresponding to the longitudinal velocity vector for the vehicle; and executing a Kalman filter to determine tire effective radii for the plurality of vehicle wheels based upon the longitudinal velocity for the vehicle, the plurality of calibrated gain factors, and the wheel speeds for the plurality of vehicle wheels.

12. The method of claim 11, further comprising:
    detecting a no-wheel-slip state for the plurality of vehicle wheels based upon the wheel speeds for the plurality of vehicle wheels; and
    executing the Kalman filter to determine tire effective radii for the plurality of vehicle wheels based upon the longitudinal velocity for the vehicle and the wheel speeds for the plurality of vehicle wheels only during the no-wheel-slip state.

13. The method of claim 11, further comprising controlling the vehicle based upon the tire effective radii for the plurality of vehicle wheels.

14. The method of claim 11, further comprising controlling an operating system of the vehicle based upon the tire effective radii for the plurality of vehicle wheels.

15. The method of claim 11, further comprising detecting a low tire pressure event for one of the vehicle wheels based upon one of the tire effective radii for the plurality of vehicle wheels.

16. The method of claim 11, further comprising estimating a mass of the vehicle based upon the tire effective radii.

17. The tire radius monitoring system of claim 1, further comprising the instruction set being executable to detect a low tire pressure event for one of the vehicle wheels based upon one of the tire effective radii for the plurality of vehicle wheels.

18. The tire radius monitoring system of claim 7, further comprising the instruction set being executable to detect a low tire pressure event for one of the vehicle wheels based upon one of the tire effective radii for the plurality of vehicle wheels.

19. The tire radius monitoring system of claim 7, further comprising the instruction set being executable to correlate vehicle mass and tire pressure to the tire effective radii.

* * * * *